United States Patent [19]
Laatu

[11] Patent Number: 5,960,345
[45] Date of Patent: Sep. 28, 1999

[54] LOCATION UPDATING IN A CELLULAR RADIO SYSTEM

[75] Inventor: Juho Laatu, Helsinki, Finland

[73] Assignee: Nokia Telecommunications Oy, Espoo, Finland

[21] Appl. No.: 08/812,948

[22] Filed: Mar. 4, 1997

Related U.S. Application Data

[63] Continuation of application No. 08/448,365, filed as application No. PCT/FI93/00505, Nov. 30, 1993, abandoned.

[30] Foreign Application Priority Data

Nov. 30, 1992 [FI] Finland ................................. 925447

[51] Int. Cl.$^6$ ...................................................... H04Q 7/20
[52] U.S. Cl. ......................... 455/435; 455/456; 455/432
[58] Field of Search ................................ 455/33.1, 33.4, 455/34.1, 54.1, 56.1, 57.1, 54.2, 33.2, 67.1; 379/59, 60, 422, 432, 435, 440–441, 443–444, 456–457, 524–525, 517, FOR 100, FOR 103

[56] References Cited

U.S. PATENT DOCUMENTS

| | | |
|---|---|---|
| 4,876,738 | 10/1989 | Selby . |
| 5,212,822 | 5/1993 | Fukumine et al. ..................... 455/33.1 |
| 5,305,466 | 4/1994 | Taketsugu ............................... 455/54.1 |
| 5,309,501 | 5/1994 | Kozik et al. ............................. 455/57.1 |
| 5,361,396 | 11/1994 | Onoe et al. .............................. 455/56.1 |
| 5,396,543 | 3/1995 | Beeson, Jr. et al. .................... 455/34.1 |
| 5,548,816 | 8/1996 | DeVaney ................................ 455/33.1 |

FOREIGN PATENT DOCUMENTS

| | | |
|---|---|---|
| 439628 | 8/1991 | European Pat. Off. . |
| 475865 | 3/1992 | European Pat. Off. . |
| 2-110925 | 5/1990 | Japan ............................ 455/FOR 100 |
| 3-73625 | 3/1991 | Japan ............................ 455/FOR 100 |
| 4-3534 | 1/1992 | Japan ............................ 455/FOR 100 |
| 2243976 | 11/1991 | United Kingdom . |

OTHER PUBLICATIONS

Taketsugu, et al: "Holonic Location Registration/Paging Procedure in Microcellular Systems", IEICE Trans. Fundamentals, vol. E75–A., No. 12 Dec. 1992, pp. 1652–1659.

Brody, et al: "SubscruberTracking and Locating in Personal Communications Networks", IEICE 1992, vol. 1, Oct. 1992, pp. 307–311.

Markoulidakis et al: "Method for efficient location area planning in mobile telecommunications", Electronics Letters, Dec. 1993, vol. 29, No. 25, pp. 2165–2166.

Brody, et al: 4518551 Inspec Abstract No. b9312–6250F–065, see abstract.

*Primary Examiner*—Nguyen Vo
*Attorney, Agent, or Firm*—IP Group of Pillsbury Madison & Sutro LLP

[57] ABSTRACT

The invention relates to a cellular radio network and a method for performing location updating in a cellular radio system. The cellular radio network does not employ fixed location areas, as prior cellular radio networks do, but it employs a location area configuration which is subscriber station specific and dynamically adaptive. In connection with each location updating, it is therefore possible to select an optimal location area for the subscriber station at that particular moment, the selected location area being preferably of an arbitrary size and form. It is thus possible to define the location area subscriber station specifically in such a manner that, on one hand, it is sufficiently large so that the subscriber station does not have to perform location updating frequently but, on the other hand, sufficiently small so that the paging of the subscriber station does not load the cellular radio network too much. The network and method also allow the use of completely subscriber station specific location areas.

16 Claims, 2 Drawing Sheets

LOCATION UPDATING IN A CELLULAR RADIO SYSTEM

This is a continuation of application Ser. No. 08/448,365, filed on May 30, 1995, which was abandoned upon the filing hereof which is a 371 of PCT/FI93/00505, filed Nov. 30, 1993.

FIELD OF THE INVENTION

The invention relates to cellular radio networks, and particularly to mobility management and location updating in cellular radio networks.

BACKGROUND OF THE INVENTION

In cellular radio systems the mobile radio stations, i.e. subscriber terminals, may roam from one cell to another within the area of the cellular network. A cellular radio network usually keeps files on the location of a mobile station with an accuracy of a so-called location area. Cellular radio networks employ a fixed location area configuration: each location area permanently consists of the same cells and their base stations. The location area information broadcast by a base station informs a mobile station of the location area to which the base station belongs. When the mobile station moves to another cell within the same location area, location updating to the cellular radio network is not needed. However, when the mobile station, on the basis of the location area information, observes that the location area changes with the new base station, it starts location updating by sending a location updating request to the cellular radio network. As a result of this location updating request, the cellular radio network stores the new location area of the mobile station as location data in the subscriber database.

As the location of a mobile station is known only with an accuracy of a location area, the mobile station must be paged in all radio cells belonging to this location area, e.g. for the establishment of an in-coming call. This results in a considerable signalling load in the radio network between the exchange and the base stations and also on the radio path. On the other hand, to reduce the size of a location area in order to avoid the above-mentioned drawback leads to the fact that a mobile station changes location areas more frequently, whereby the location updating frequency and the signalling caused by it increase. At present the tendency is towards larger location areas with the aim of reducing the location updating frequency.

SUMMARY OF THE INVENTION

An object of the present invention is a cellular radio network in which the signalling load caused by both the paging of a subscriber and location updating is reduced.

This is achieved in a cellular radio network in which each cell broadcasts one or more location area identifiers or an identifier suitable for use as such and which comprises mobile subscriber equipments capable of roaming in such a manner that location data of the mobile subscriber equipments are stored in the cellular radio network with an accuracy of a location area, consisting of one or more cells. According to the invention, the cellular radio network has a location area configuration which is subscriber equipment specific and dynamically adaptive.

A further object of the invention is a method for performing location updating in a cellular radio system, comprising the steps of storing information on the location of a mobile subscriber equipment with an accuracy of a location area, consisting of one or more cells, broadcasting in each cell one or more location area identifiers or an identifier suitable for use as such, updating the information on the location of the subscriber equipment at least when the subscriber equipment moves to a cell the location area identifier broadcast cast by which does not belong to the location area defined by the present stored location data of the subscriber equipment. The method of the invention is characterized by employing a dynamic location area configuration in such a manner that a new location area of a suitable size is selected or formed for the mobile subscriber equipment according to a certain criterion, selecting or forming a name for the new location area in such a manner that it includes a location area identifier of each cell belonging to the location area, storing the new name of the location area as location data of the mobile subscriber equipment, and informing the mobile subscriber equipment of the new location area.

The cellular radio network of the invention is not divided into fixed location areas as in prior cellular radio networks, but it employs a location area configuration which is subscriber station specific and dynamically adaptive. In connection with each location updating, it is therefore possible to select a location area which is best fit for the subscriber station at that particular moment and which is preferably of an arbitrary size and form. The criteria used in the selection or formation of a suitable location area may be, for example, the assumed degree of mobility of the subscriber station, the assumed number of subscriber station terminating calls, a cellular network specific location area strategy, and the load in the cellular network.

By means of the invention, location areas can be defined in a flexible manner; different environments, groups of users and situations can be adapted to more closely, and the capacity of the cellular network can thus be improved, as it is not necessary to design the location area configuration of the cellular network fixedly according to extremities or the average use. The location area can thus be defined subscriber station specifically in such a manner that, on one hand, it is sufficiently large so that a subscriber station does not have to perform location updating frequently but, on the other hand, sufficiently small so that the paging of the subscriber station would not load the cellular radio network too much. The invention allows the use of completely subscriber station specific location areas, which has, for example, the following advantages:

- the location area of stationary subscriber stations can be set to be smaller than that of highly mobile subscriber stations,
- the location area of the subscriber stations which receive a high number of calls can be set to be small,
- the location area can be defined according to the normal mobility of a subscriber station or its user,
- a private CPN (Customer Premises Network) within the area of the cellular radio network can be taken as part of the location area of a subscriber station, whereby it is not necessary to perform location updating when the subscriber station moves from a "public" cellular network to a private CPN or vice versa,
- it is easy to define partly or fully over-lapping location areas of very different sizes and shapes.

BRIEF DESCRIPTION OF THE DRAWINGS

In the following, the invention will be described in more detail by means of embodiments and with reference to the accompanying drawings, in which.

PREFERRED EMBODIMENTS OF THE INVENTION

Figure 1:
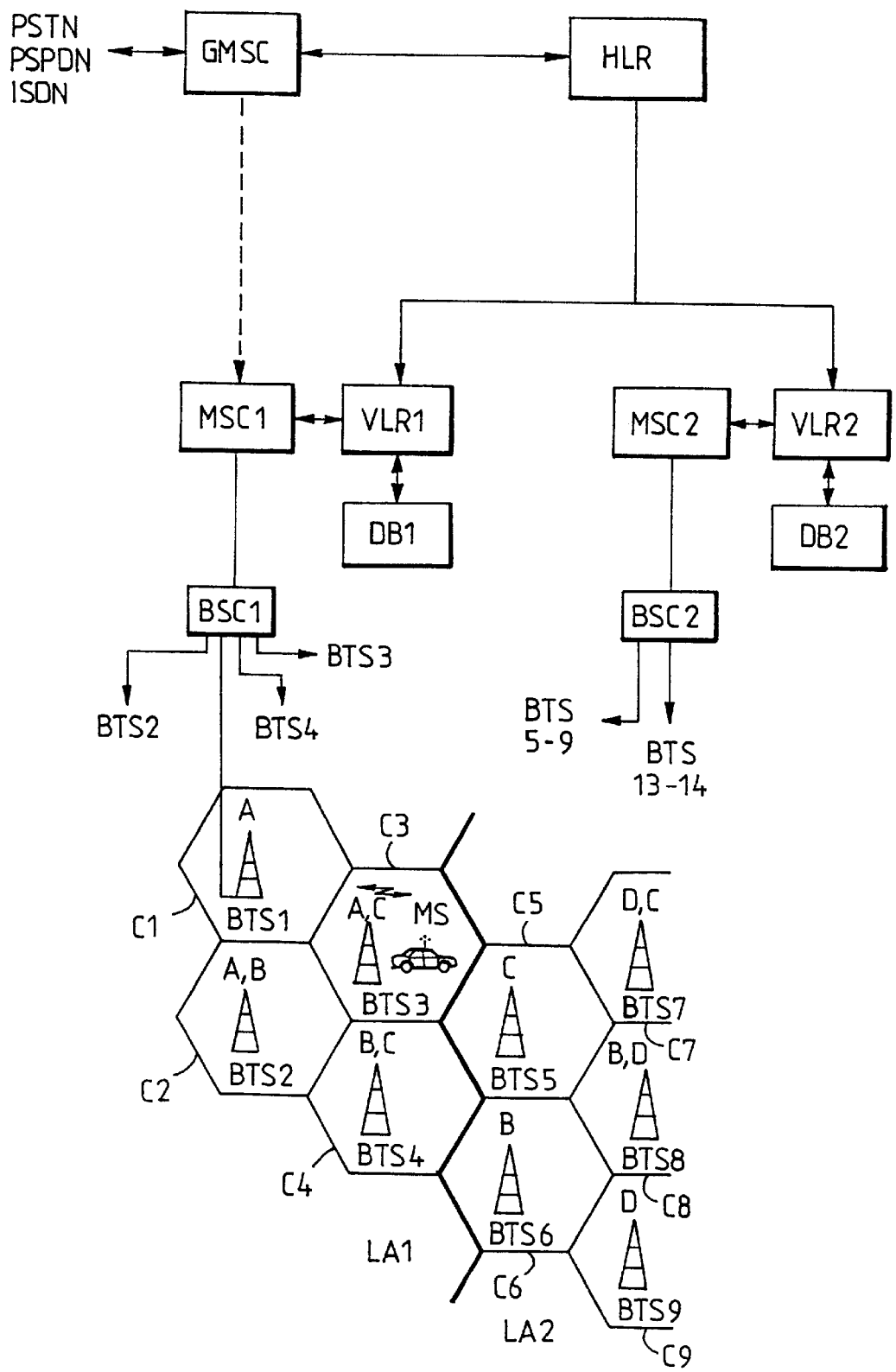
FIG. 1 is a general view of a cellular radio system to which the present invention may be applied.

The present invention may be applied to any cellular radio system, such as the digital GSM mobile phone system, NMT (Nordic Mobile Telephone), DCT1800, PCN (Personal Communication Network), UMC (Universal Mobile Communication), UMTS (Universal Mobile Telecommunication System), FPLMTS (Future Public Land Mobile Telecommunication System), etc.

As is well known, the geographical area covered by a cellular radio network is divided into separate smaller radio areas called cells. When a mobile station MS is located within a cell, it communicates with the network through a fixed radio station, or base transceiver station BTS, located in the radio cell. The mobile stations MS (subscriber equipments) belonging to the system may roam freely within the area of the system from one cell to another. A cellular radio network must, however, have information on the location of a mobile station MS in order to be able to route incoming calls to the MS or page the MS for some other reason. Typically, a cellular radio network knows the location of an MS with an accuracy of a larger area consisting of one or more cells, which is usually called a location area. Conventional cellular networks employ a so-called fixed location area configuration, in which cells are grouped into fixed location areas bordered by each other in such a manner that each cell belongs only to a single location area.

Base stations of a cellular radio network broadcast continuously information on themselves and their environment, e.g. a location area identifier LAI, a base station identifier BSI, and a base station type identifier BSTI. On the basis of the location area identifier broadcast by a BTS, an MS registered in the cell knows which location area the BTS belongs to. Instead of a specific location area identifier, this information can also be obtained or derived from some other system information broadcast by the base station. If the MS observes that the location area identifier changes when the base station BTS is changed, i.e. that the location area changes, the MS starts location updating by sending a location updating request to the cellular radio network. If the location area does not change, the MS does not perform location updating. On account of location updating, the subscriber data of the MS concerned is updated in the subscriber databases of the cellular radio network. For example, in the GSM system illustrated in FIG. 1 the cellular radio network comprises at least a home location register HLR, visitor location registers VLR, mobile switching centres (mobile exchanges) MSC, and base station controllers BSC connected to base stations BTS of the network. The location area data of an MS is stored in visitor location registers VLR, of which there are typically one per each MSC, whereas the HLR knows which VLR area the MS is visiting. The structure and operation of the GSM system are described more closely e.g. in the GSM specifications and *The GSM System for Mobile Communications* by M. Mouly & M-B. Pautet, Palaiseau, France, ISBN 2-9507190-0-7.

For the sake of clarity, FIG. 1 shows only a few cells of a cellular radio network, i.e. cells C1–C9 with their corresponding base stations BTS1–BTS9. A mobile station MS having a bidirectional radio connection with base station BTS3 is illustrated in cell C3. Base stations BTS1–BTS4 are connected to base station controller BSC1, and base stations BTS5–BTS9 correspondingly to base station controller BSC2.

As stated above, cellular networks typically know the location of an MS with an accuracy of one location area. The cellular radio network of the present invention employs a location area configuration which is subscriber station specific and dynamically adaptive. This means that location areas are not fixed groups of cells that are the same for all mobile stations MS, but they can be defined MS specifically and according to each instance of location updating. In connection with each location updating, it is possible to select or form the most suitable location area for the MS whose location data is updated by the use of certain criteria. In this way it is possible to optimize subsequent location updating and paging signalling in the cellular network.

For this purpose, each cell C (or base station BTS) broadcasts one or more location area identifiers. In this connection, a location area identifier refers to any information broadcast by a cell, e.g. a base station identifier or cell identifier, which can be used as a location area identifier. In FIG. 1, for example, cells C1, C2, C3, C4, C5, C6, C7, C8 and C9 broadcast identifiers "A", "A,B", "A,C", "B,C", "C", "B", "D,C", "B,D" and "D, respectively.

In the case of FIG. 1, let us assume that the mobile station MS located in cell C3 transmits a location updating request to the base station BTS3 of the cell because, for example, the MS observes that both of the location area identifiers "A,C" broadcast by the BTS3 are different from those broadcast on the location area it was previously registered in. Upon receipt of the location updating request, the cellular radio network, according to a certain criterion, selects or forms for the MS a new location area which is of a suitable size and form and which usually comprises at least the current location cell C3 of the MS. Alternatively, it is also possible to define a location area which does not comprise the present location cell. In this case, the cells should overlap each other geographically, and the mobile station should be able to receive the broadcast of a cell belonging to the new location area.

In the case illustrated in FIG. 1, the MS is located in cell C3, and the cellular network may assign the MS, for example, one of the following location areas:

location area <A>, covering cells C1, C2, C3 (base stations BTS1, BTS2, BTS3), location area <C>, covering cells C3, C4, C5, C7, location area <B,C>, covering cells C2, C3, C4, C5, C6, C7, C8, location area <A,B>, covering cells C1, C2, C3, C4, C6, C8.

The cellular network may thus assign the MS any location area, either one already in use or a completely new one. Subscriber specific location areas, covering for instance the normal roaming routes of an MS, may be stored in the subscriber databases of a cellular network, such as a HLR or a VLR. These assumed location areas can be used, for example, whenever the MS moves to their coverage area in the cellular network. In networks where subscribers can freely change subscriber equipments (e.g. in the GSM system by the use of a subscriber specific smart card SIM), it is possible to use criteria pertaining to both the subscriber equipment and the user. Roaming areas, for example, may be strongly associated with e.g. the office and home of the user. The subscriber equipment, however, may be rented and without a "home". On the other hand, even a subscriber equipment may have an assumed roaming area, e.g. the route of a coach or a train.

The criteria used in the selection or formation of a suitable location area may include, for example, the assumed degree of mobility of an MS or a user, the assumed roaming area of an MS or a user, the assumed number of incoming calls to an MS or a user, a cellular network specific location area strategy, and the load in the cellular network. The two first-mentioned pieces of information can be obtained from mobility and call statistics which the network may compile for instance in a separate statistics database (e.g. in FIG. 1, statistics databases DB1 and DB2 associated with visitor location registers VLR1 and VLR2). On the basis of mobility statistics, the location area of a stationary MS, for example, can be set to be smaller than that of a highly mobile MS. Correspondingly, on the basis of call statistics, the location area of an MS receiving a large number of calls can be set to be smaller than that of an MS receiving a small number of calls.

When the network has selected or formed a new location area for the MS, it stores the name of the new location area in the location data of the MS (e.g. in a VLR). The name of the new location area is formed in such a manner that it includes at least one location area identifier of each cell belonging to the location area. In addition, the cellular radio network informs the mobile station MS of the new location area by means of signalling via the base station BTS3. Thereafter, when moving from one cell to another within the cellular network, the MS compares the location area identifier(s) broadcast by the new cell with the current location area name determined for the MS; on the basis of the comparison, it determines whether the new cell belongs to the location area given or not. If the location area is the same, the MS does not send a new location updating request. If the location area identifier broadcast by the new cell does not correspond to the one included in the name of the given location area, the MS sends a location updating request in a normal manner to the base station of the cell. It should thus be noted that the MS does not perform location updating to the location area determined by the location area identifier broadcast by the cell, as in conventional systems, but only to the cell which no longer belongs to the previous location area of the MS. In a way, the MS only informs that a new location area is needed. It is the cellular network that in the manner described above determines the new location area used and informs the MS of it.

The cellular network may define the location area of the MS again whenever it is in contact with the MS without a location updating request sent by the MS. The cellular network may also page the MS expressly for the change of location area. Such additional location updating may be performed, for example, when the cellular network on the basis of call and mobility statistics observes that the MS has been stationary for several calls and wishes therefore to reduce the size of the location area of the MS. The cellular network may also have the possibility of changing the location area identifiers broadcast by cells in a desired manner so as to allow the introduction of a desired new location area.

Instead of the above-described methods of forming a location area, it is also possible to use more complicated methods. The name of a location area may, for example, indicate which location area identifiers do not belong to the location area of the MS, define the location area as an intersection of areas, etc. The cells belonging to the location area may be defined, for example, by indicating the location areas or individual location area identifiers to the intersection of which the cell belongs. On the other hand, the broadcast of the cell defines that the cell belongs to the location area by indicating the location areas or individual location area identifiers to which the cell does not belong, or the location areas or individual location area identifiers to the intersection of which the cell belongs.

The additional operations required by the invention may be performed by means of changes in the software of cellular network components which are associated with location updating and which are also used in the known networks. In the GSM system such a component may be, for example, a visitor location register VLR.

The location area identifiers broadcast by cells may form hierarchical name structures: a group of identifiers may be gathered together by the use of a group identifier illustrating the entire group of names. In this case it is possible to use for instance a "wildcard", known from the disk operating system DOS of micro computers; the symbol * used in connection with or instead of a name denotes a zero, or one or more symbols which can be freely selected. The identifier "AB*", for example, encompasses the identifiers "ABAA", "ABAB" and "ABCC", etc. The name of the location area of the MS may be a combination of one or more location area identifiers or group identifiers, e.g. <ABAA> or <ABA*,ABCC>. The location area of the MS covers all cells broadcasting a location area identifier belonging to the combination.

Figure 2:
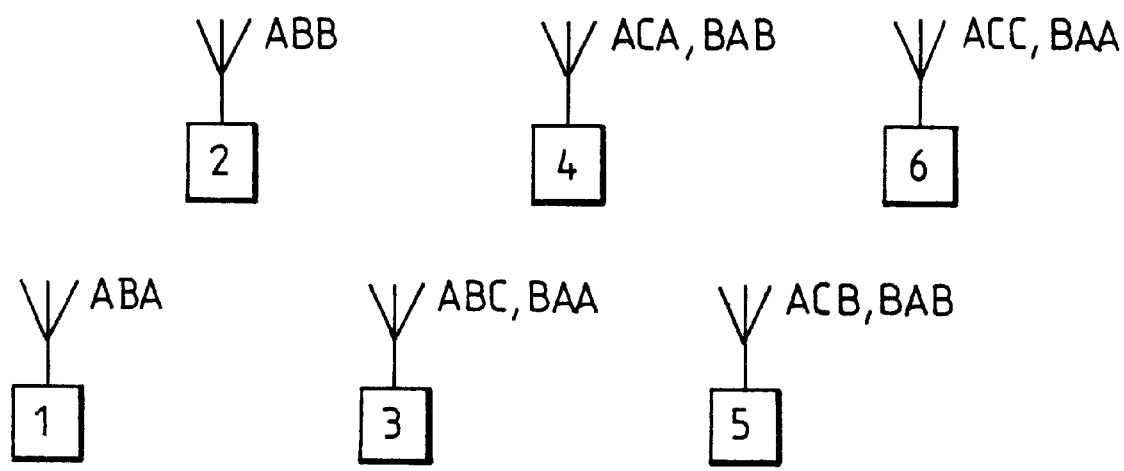
FIG. 2 illustrates a cellular radio system in which the base stations broadcast hierarchical base station identifiers.

In the case illustrated in FIG. 2, the following location areas, for example, can be assigned to the terminal by the use of hierarchical names:

location area <A*>, covering all base stations,
location area <AB*,ACC>, covering base stations 1, 2, 3 and 6,
location area <BAB>, covering base stations 4 and 5.

In FIG. 2, the location area identifiers beginning with A can be interpreted as names of cells, and those beginning with B as special areas supplementing the structure of the cellular network. The invention allows private CPN (Customer Premises Network) radio systems to be taken as part of the location area of an MS; thus it is not necessary to perform location updating when the MS moves from a public cellular network to a private CPN or vice versa.

The figures and the description thereof are intended merely to illustrate the present invention. In its details the cellular radio network and method of the invention may vary within the scope of the appended claims.

I claim:

1. A cellular radio network in which each cell broadcasts one or more location area identifiers or an identifier suitable for use as a location area identifier and which comprises:

a plurality of mobile subscriber equipment capable of roaming in such a manner that location data of the plurality of mobile subscriber equipment are stored in the cellular radio network with an accuracy of a location area consisting of one or more cells; and a location area configuration in the cellular radio network which is subscriber equipment specific and dynamically adaptive, the cellular radio network freely defining a location area individually for each one of the plurality of mobile subscriber equipment in connection with any location updating transaction according to mobility characteristics or traffic characteristics of a respective one of the plurality of mobile subscriber equipment only or a subscriber only, whereby location areas defined at a given moment for different ones of the plurality of mobile subscriber equipment in a same cell differ from each other, and at least one of the location areas is completely new.

2. A cellular radio network according to claim 1, wherein a single cell belongs simultaneously to several of the subscriber specific equipment location areas.

3. A cellular radio network comprising:

a plurality of cells, each having a respective base station for transmitting to and receiving from mobile subscribers by radio;

a plurality of mobile station equipment associated with respective ones of the mobile subscribers and arranged for roaming within a system area which includes the plurality of cells;

a location data storage system arranged to dynamically keep track of respective locations of the mobile station equipment to a degree of accuracy equating to one of a plurality of location areas in which a respective one of the mobile station equipment was disposed when the location data storage system was most recently updated as to the location of the respective one of the mobile station equipment, each one of the plurality of location areas including all of at least one cell of the plurality of cells, but fewer than all cells of the plurality of cells of the system area, and the plurality of mobile station equipment and the base stations being arranged to update the location data storage system, in respective location-updating transactions; and a location area configuration facility operatively associated with the location data storage system, and dynamically, adaptively defining independently for each one of the plurality of mobile station equipment a location area configuration which is specific to each of the ones of the plurality of mobile station equipment and which depends on at least one of a plurality of characteristics pertaining to the respective one of the plurality of mobile station equipment only or to a respective one of the mobile subscribers only, the plurality of characteristics including:

an assumed degree of mobility of the respective one of the plurality of mobile station equipment only or the respective one of the mobile subscriber only, an assumed roaming area of the respective one of the plurality of mobile station equipment only or the respective one of the mobile subscriber only, and an assumed number of incoming calls to the respective one of the mobile station equipment only or the respective one of the mobile subscriber only, whereby the location area configuration defined at a given moment for different ones of the plurality of mobile station equipment in a same cell differ from each other, and wherein at least one the location areas is completely new.

4. A cellular radio network comprising:

a plurality of radio cells, a plurality of mobile subscriber equipment, a dynamic location area configuration in which each one of a plurality of mobile subscribers has a dynamic mobile subscriber specific location area configuration selected or formed according to the current location of the subscriber and mobility or traffic characteristics of a respective one of the plurality of mobile subscriber equipment only or a respective subscriber only, to thereby optimize the location area configuration of the respective subscriber or the respective one of the plurality of mobile subscriber equipment, each of the plurality of radio cells broadcasting at least one location area identifier or an identifier suitable for use as a location area identifier, a data base storing location data of the plurality of mobile subscriber equipment, the location data including a name of a respective one of a plurality of mobile subscriber specific location areas, the name including at least one location area identifier of each one of the plurality of radio cells belonging to the respective one of the mobile subscriber specific location areas, the network being arranged to inform each one of the plurality of mobile subscriber equipment of the name of the respective one of the mobile subscriber specific location areas, the network being arranged to update the respective one of the mobile specific location areas of a respective mobile subscriber at least when the respective mobile subscriber moves to a cell in which any of the location area identifiers broadcast by the cell does not include any of the location area identifiers in the name of the respective one of the mobile subscriber specific location areas, whereby location areas of different mobile subscribers updated at the same moment in a same cell differ from each other, and at least one of the location areas is completely new.

5. A cellular radio network according to claim 4, wherein:

the name of the respective one of the mobile subscriber specific location areas is formed from a combination of the location area identifiers of at least one cell area belonging to the respective one of the mobile subscriber specific location areas.

6. A cellular radio network according to claim 4, wherein:

the name of the respective one of the mobile subscriber specific location areas defines the radio cells belonging to the respective one of the mobile subscriber specific location areas by indicating ones of the mobile subscriber specific location areas or individual location area identifiers to which each of the radio cells belongs.

7. A cellular radio network comprising:

a plurality of radio cells;

a plurality of mobile subscriber equipment;

a dynamic location area configuration in which each one of a plurality of mobile subscribers has a dynamic mobile subscriber specific location area configuration selected or formed according to the current location of the subscriber and mobility or traffic characteristics of a respective one of the plurality of mobile subscriber equipment only or a respective subscriber only, to thereby optimize the location area configuration of the respective subscriber or the respective one of the plurality of mobile subscriber equipment;

each of the plurality of radio cells broadcasting at least one location area identifier or an identifier suitable for use as a location area identifier;

a data base storing location data of the plurality of mobile subscriber equipment, the location data including a name of a respective mobile subscriber specific location area, the name including a group identifier representing a group of location area identifiers;

the network being arranged to inform each one of the plurality of mobile subscriber equipment of the name of the respective mobile subscriber specific location area;

the network being arranged to update the mobile subscriber specific location area of the mobile subscriber at least when one of the mobile subscribers moves to a cell in which any of the location area identifiers broadcast by the cell does not match with the name of the respective mobile subscriber specific location area, whereby different ones of the mobile subscribers at the same moment in the same cell are updated to different ones of the mobile subscriber specific location areas, and at least one of the mobile subscriber specific location areas is completely new.

8. A method for performing location updating in a cellular radio network, the method comprising:

employing a dynamic location area configuration in such a manner that a mobile subscriber specific location area of at least one cell is selected or formed for each one of a plurality of mobile subscribers according to the current location of the subscriber and mobility or traffic characteristics of a respective one of a plurality of mobile subscriber equipment only or a respective mobile subscriber only, to thereby optimize the location area configuration of the respective mobile subscriber or the respective one of the plurality of mobile subscriber equipment;

broadcasting in each cell of the cellular radio network at least one location area identifier or an identifier suitable for use as a location area identifier;

selecting or forming a name for each one of the mobile subscriber specific location areas in such a manner that the name includes at least one location area identifier of each cell belonging to a respective one of the mobile subscriber specific location areas;

storing the name of the respective one of mobile subscriber specific location areas as location data for a respective one of the mobile subscribers in a subscriber data base of the cellular radio network;

informing the respective one of the mobile subscribers of the respective one of the mobile subscriber specific location areas;

updating the respective one of the mobile specific location areas of the respective one of the mobile subscribers at least when the respective one of the mobile subscribers moves to a cell in which any of the location area identifiers broadcast by the cell does not include any of the location area identifiers in the name of the respective one of the mobile subscriber specific location areas, whereby different mobile subscribers updated at the same moment in the same cell are informed of different ones of the mobile subscriber specific location areas, and at least one of the mobile subscriber specific location areas is completely new.

9. A method according to claim 8, wherein:

in conducting the selecting or forming of the name of each one of the mobile subscriber specific location areas the selecting or forming is performed using at least one criterion selected from a group consisting of an assumed degree of mobility of the respective one of the mobile subscribers, an assumed roaming area of the respective one of the mobile subscribers, an assumed number of incoming calls to the respective one of the mobile subscribers, a cellular network specific location area strategy, and a load in the cellular radio network.

10. A method according to claim 8, further comprising:

selecting or forming a new mobile subscriber specific location area for the respective one of the mobile subscribers, if necessary, whenever there is a connection with a mobile subscriber station of the respective one of the mobile subscribers or when the mobile subscriber station or network establishes a connection for selecting or forming a new subscriber specific location area.

11. A method according to claim 8, further comprising:

reducing a size of one of the mobile subscriber specific location areas when a change in the criteria determining the one of the mobile subscriber specific location areas or factors affecting the criteria is detected.

12. A method according to claim 8, further comprising:

changing the location area identifiers broadcast by the cells to allow use of a new location area or to change present location areas.

13. A method according to claim 8, wherein:

the name of one of the mobile subscriber specific location areas or the location identifier broadcast by one of the cells comprises a group identifier illustrating a group of the location area identifiers.

14. A method according to claim 8, wherein:

the name of one of the mobile subscriber specific location areas is a combination of the location area identifiers of at least one cell belonging to the one of the mobile specific location areas.

15. A method according to claim 8, wherein:

the name of the respective one of the mobile subscriber specific location areas defines the radio cells belonging to the respective one of the mobile subscriber specific location areas by indicating the ones of the mobile subscriber specific location areas or individual location area identifiers to which each of the radio cells belongs.

16. A method according to claim 8, wherein:

a broadcast of one of the radio cells defines that the one of the radio cells belongs to one of the mobile subscriber specific location areas by indicating ones of the mobile subscriber specific location areas or individual location area identifiers to which the one of the radio cells does not belong, or ones of mobile subscriber specific location areas or individual location area identifiers to which the one of the radio cells belongs.

* * * * *